Figure 1:
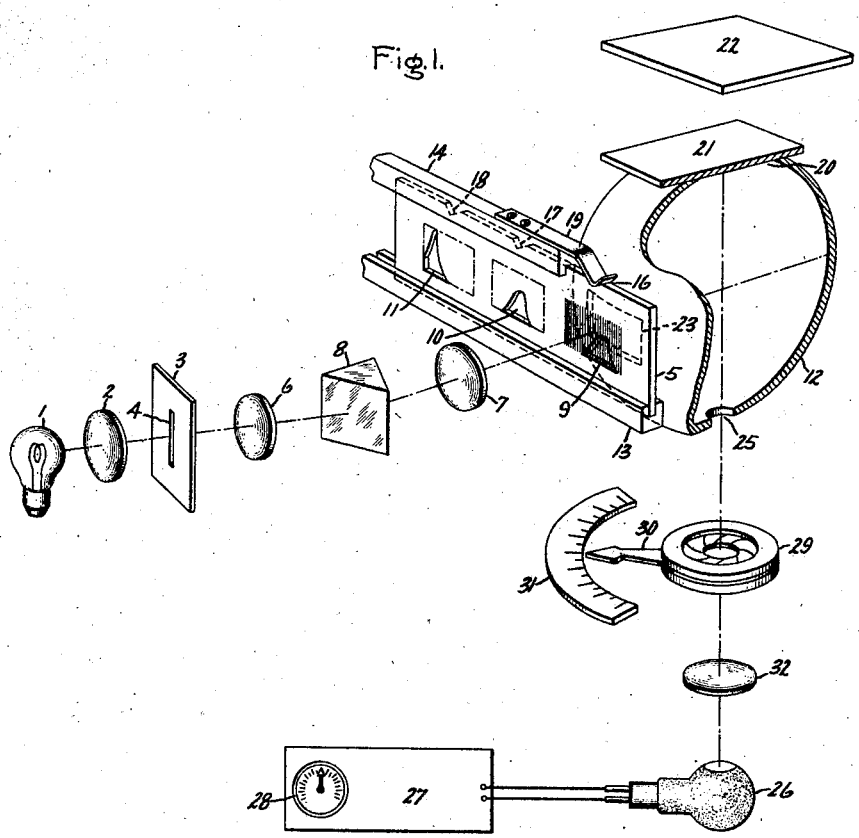

July 7, 1936.    H. B. MARVIN    2,046,958
COLORIMETER
Filed March 21, 1935    2 Sheets-Sheet 1

Inventor:
Harry B. Marvin,
by Harry E. Dunham
His Attorney.

Red Sensation Curve of Eye.

Energy Distribution of Light Source.

Photo Tube Sensitivity.

Curve for determining outline of window for Red Sensation Plate.

Inventor:
Harry B. Marvin,
by Harry E. Dunham
His Attorney.

Patented July 7, 1936

2,046,958

UNITED STATES PATENT OFFICE 2,046,958

COLORIMETER

Harry B. Marvin, Schenectady, N. Y., assignor to General Electric Company, a corporation of New York Application March 21, 1935, Serial No. 12,178

6 Claims. (Cl. 88—14)

My invention relates to colorimeters. One object of my invention is the provision of an improved colorimeter by means of which one may obtain one or more primary color sensation values of a sample with reference to a standard. Another object of my invention is the provision of an improved colorimeter with which the sample may be illuminated by diffused light and a relatively large area thereof may be tested. A further object is the provision of a colorimeter whose operation is rapid and which is simple in construction and inexpensive to manufacture.

In accordance with my invention I produce a spectrum by dispersing the light from a suitable source, illuminate the standard and the sample by the light of one color portion of the spectrum and compare the energy reflected from the sample with that reflected from the standard. The amount of light of the various wavelengths included in the one color portion of the spectrum being used is controlled by a window whose shape is dependent primarily upon the color sensation curve of the eye for that particular color portion of the spectrum. Inasmuch as the energy distribution of the light source is not uniform throughout the spectrum the shape of the window is modified in accordance with the energy distribution curve. Likewise since the photo tube sensitivity also is not uniform throughout the spectrum the shape of the window is further modified in accordance with the photo tube sensitivity curve.

Having made the comparison of the light reflected from the sample and from the standard, the window is replaced by one which will pass the light of a different color portion of the spectrum and again the energy reflected by the sample is compared with that reflected by the standard. The shape of the substituted window is dependent primarily as before on the color sensation curve of the eye for the said different color portion of the spectrum and is modified as before by the energy distribution and the photo-sensitivity curves. In like manner another or a plurality of other comparisons may be made using light from another or other color portions of the spectrum, in each case a window being provided whose shape is dependent upon the color sensation curve of the eye for that color portion modified by the energy distribution and photo-tube sensitivity curves.

My invention will be better understood from the following description taken in connection with the accompanying drawings, and its scope will be pointed out in the appended claims.

Figure 2:
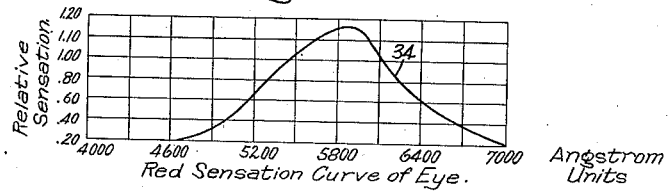
Figure 3:
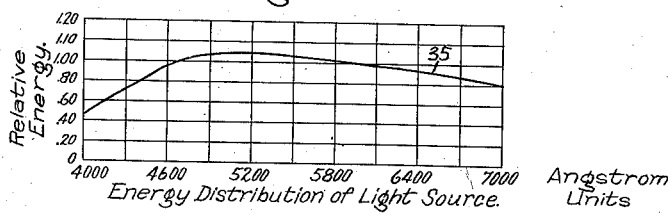
Figure 4:
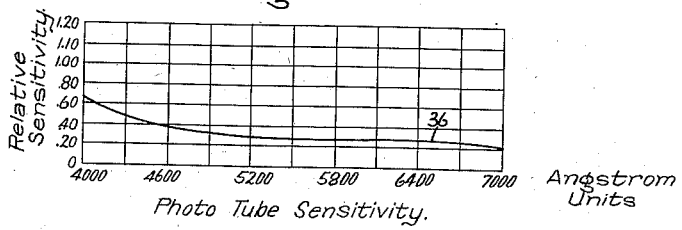
Figure 5:
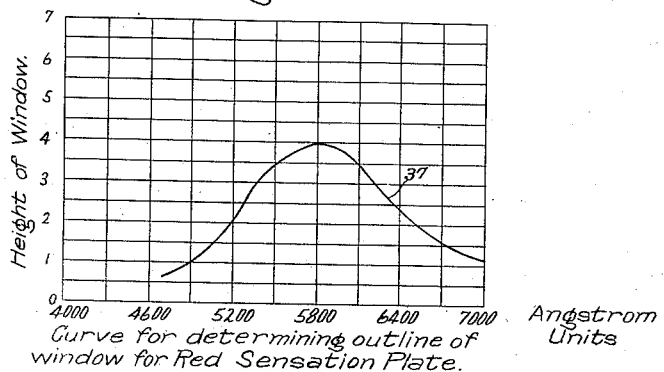

Referring to the drawings, Fig. 1 is a perspective view of apparatus illustrating one embodiment of my invention; Figs. 2, 3 and 4 respectively show a red sensation curve of the eye, an energy distribution curve of the light source and a photo-tube sensitivity curve; Fig. 5 shows the curve for determining the outline of the window in the plate for the red sensation.

Referring to Fig. 1 the source of light, such for example, as an incandescent lamp, is represented at 1. Light from this source is concentrated by the lens 2 on the aperture plate 3 having therein the narrow aperture 4. By means of a suitable optical system, the light which passes the opening 4 is dispersed and focused upon the plate 5. The optical system in the present case is represented as comprising the lenses 6 and 7 between which is arranged the prism 8. Plate 5 is shown having three light openings 9, 10 and 11 arranged at spaced points longitudinally thereof through which openings the light from different portions of the spectrum is adapted to pass into the integrating sphere 12. The plate 12 is shown as supported in the two guides 13 and 14 and as being provided with three notches 16, 17 and 18 at its upper edge into which the spring detent 19 is adapted to engage for holding the plate in any one of three positions.

The integrating sphere 12 which is arranged directly behind the plate 5 may be of any common and well known form having its interior surface covered with a material which is highly reflecting. The upper portion of the sphere 12 is provided with the opening 20 which is adapted to be covered selectively by the sample 21 and the standard 22. On that side of the sphere adjacent the plate 5 is the opening 23, shown in dotted lines, by which light enters the sphere. In the bottom of the sphere is the small opening 25 through which light reflected from the sample or standard covering the opening 20 is reflected out of the sphere into the photoelectric tube 26. The tube 26 is connected through the amplifier 27 with the indicating device 28. Arranged in the path of the light between the sphere and the photo-tube is the iris diaphragm 29 which is shown having the pointer 30 arranged to cooperate with the scale 31. The latter may, for example, be calibrated to read in percent of the amount of a given color in the sample 21 with respect to the amount of the same color in the standard 22. The lens 32 serves to concentrate the light passing the diaphragm onto the window of the photo tube.

The aforementioned openings 9, 10 and 11 in the plate 5 are arranged respectively in the red, green and blue portions of the spectrum when the plate 5 is in the different positions determined by the detent; hence with the plate 5 in those positions the sample and standard are illuminated by the light respectively of the red, green and blue portions of the spectrum. The shape of the opening 9 is dependent primarily upon the shape and position of the curve representing the relative sensation of the eye to the red portion of the spectrum. This curve is shown, for example, at 34 in Fig. 2 and represents the relative sensation values over that part of the spectrum between the 4000 and 7000 Angstrom unit lines. The photo-tube 26 responds to the amount of energy received thereby but the energy of the light source 1 is not uniform throughout the range of the spectrum but varies in the manner shown by the curve 35 in Fig. 3. Hence the ordinates of the sensation curve of Fig. 2 must be divided by the corresponding ordinates of the energy distribution curve of Fig. 3 in order to correct the shape of the red sensation curve for variation in energy distribution. Moreover the photo-tube is not equally sensitive at all portions of the spectrum but varies in the manner illustrated by the curve 36 in Fig. 4. Further correction is therefore made to the red sensation curve by dividing the quotients obtained as described above by the corresponding ordinates of the photo-tube sensitivity curve shown by Fig. 4. The red sensation curve after being thus corrected for energy distribution and photo-tube sensitivity may be properly employed for shaping the opening 9 in the plate 5. This corrected curve is represented by the curve 37 shown in Fig. 5. As an example of how this curve is obtained, it will be noted that the ordinate of curve 34 at the 5800 line is 1.15, that of curve 35 at the same line is 1.02 and that of curve 36 at the same line is .28. The quotient of the first two ordinates divided by the last ordinate is 4.03 which is the height of curve 37 on the same 5800 line.

In like manner the openings 10 and 11 in the green and blue portions respectively of the spectrum are obtained by combining the green and blue sensation curves, not shown, with the energy distribution and photo-tube sensitivity curves.

In the use of the apparatus the standard 22 is placed over the window 20 of the sphere, and with the plate 5 in the position illustrated, admitting red light to the sphere, the indication of the device 28 is noted when the pointer 30 of the diaphragm indicates 100% on scale 31. The sample 21 is then substituted for the standard 22 and the diaphragm readjusted if necessary to give the same reading on the device 28. If the sample and standard differ in their power to reflect red rays, the difference will be indicated on the scale 31. The plate 5 is then shifted to the next position in which the green rays of the spectrum are passed into the sphere and similar readings taken with the standard and sample covering the opening 20 of the sphere. Finally the plate 5 is shifted to the last position in which the blue rays of the spectrum are admitted to the sphere and again readings are taken as before with the sample and standard covering the window 20.

With the plate 5 in each of its several positions, the readings taken on the scale 31 show in percent how the amount of red, blue and green of the sample compares with the amounts of the same colors in the standard. If, for example, the standard is nearly pure white, such as magnesium carbonate, and the sample is a pink colored material, the readings may show that the color composition of the material as compared with that of the standard is 50% blue, 20% green, and 45% red. On the other hand, the apparatus may be employed to compare two articles of presumably the same color; for example, the standard may be pink and the sample pink. If the match is perfect each of the three readings will be 100%. If the match is poor the readings might be 99% red, 102% green and 98% blue.

It will be seen that by this construction light from a relatively large area of the sample and the standard is reflected into the photo tube, hence irregularities in color or pattern of the sample and standard are averaged out. Also because of the greater amount of light reaching the photo tube it is possible to use diffused illumination which leads to more accurate results with materials having luster.

I have chosen the particular embodiments described above as illustrative of my invention and it will be apparent that various modifications may be made without departing from the spirit and scope of my invention which modifications I aim to cover by the appended claims.

What I claim as new and desire to secure by Letters Patent of the United States, is:

1. A colorimeter comprising a light source, means for producing a spectrum from the light thereof, means for illuminating a sample and a standard by said spectrum, means for limiting said illumination to that produced by one color portion of the spectrum, said limiting means being shaped in accordance with the eye sensation curve for that color portion and means for comparing the radiation reflected from the sample with that reflected from the standard.

2. A colorimeter comprising a light source, means for producing a spectrum from the light thereof, an integrating sphere arranged to receive said spectrum and to illuminate a sample and a standard, an apertured member arranged to limit the light entering the sphere to that of one color portion of the spectrum, the aperture in said member being shaped in accordance with the eye sensation curve for said color portion and means for comparing the radiation reflected from the sample with that reflected from the standard.

3. A colorimeter comprising a light source, means for producing a spectrum from the light thereof, an integrating sphere having an entrance window arranged to receive said spectrum and having a window adapted to receive selectively a sample and a standard, a radiant energy responsive device arranged to receive radiation reflected from said sample and standard, a plate covering said entrance window having an aperture positioned to pass light at a predetermined color portion of said spectrum and shaped in accordance with the eye sensation curve for said color portion modified by the color sensitivity curve of said device.

4. A colorimeter comprising a light source, means for producing a spectrum from the light thereof, an integrating sphere having an entrance window arranged to receive said spectrum and having a window adapted to receive selectively a sample and a standard, a radiant energy responsive device arranged to receive radiation reflected from said sample and standard, means for covering said entrance window having a plurality of apertures each positioned to admit light of a different predetermined color portion of said spectrum, said apertures being shaped in accordance with the eye sensation curves of said color portions respectively.

5. A colorimeter comprising a light source, means for producing a spectrum from the light thereof, an integrating sphere having an entrance window arranged to receive said spectrum and having a window adapted to receive selectively a sample and a standard, a radiant energy responsive device arranged to receive radiation reflected from said sample and standard, an aperture strip having three portions each adapted to cover said entrance window and each portion having an aperture positioned to admit light of a different color portion of the spectrum, each of said apertures being shaped in accordance with the eye sensation curve of that color portion modified by the color sensitivity curve of said device and by the energy distribution curve of said source, means for admitting light to said device reflected from said sample and standard and means for indicating the energy received by said device.

6. A colorimeter comprising a light source, means for dispersing light therefrom to form a spectrum, an integrating sphere having a window arranged to receive said spectrum, an aperture member arranged to cover said window in each of a plurality of different positions, said member in each position thereof having a light opening, the several openings being arranged to pass light of different color portions of the spectrum, each opening being shaped in accordance with the eye sensation curve for that color and means by which the light entering said sphere and reflected by a sample may be compared with that reflected by a standard.

HARRY B. MARVIN.